United States Patent
Waronitza et al.

(10) Patent No.: US 6,321,870 B1
(45) Date of Patent: Nov. 27, 2001

(54) AIR INTAKE MEANS WITH WATER SEPARATOR

(75) Inventors: Josef Waronitza, Unterumbach; Hansjörg Kauschke, Deisenhofen; Michael Walther, Germering; Tilman Schattat, München; Werner Zimmermann, Gröbenzell, all of (DE)

(73) Assignee: Webasto Thermosysteme GmbH, Stockdorf (DE)

( * ) Notice: Subject to any disclaimer, the term of this patent is extended or adjusted under 35 U.S.C. 154(b) by 0 days.

(21) Appl. No.: 09/510,644

(22) Filed: Feb. 22, 2000

(30) Foreign Application Priority Data

Feb. 20, 1999 (DE) .............................................. 199 07 264

(51) Int. Cl.⁷ .................................................. F02M 35/00
(52) U.S. Cl. .................... 181/229; 181/214; 181/217; 181/222
(58) Field of Search ................... 181/229, 214, 181/217, 222, 238, 243, 234, 252, 256, 282, 269; 122/34, DIG. 1, DIG. 2, DIG. 3; 431/22, 346; 237/12.3 A, 12.3 R, 12.4, 30

(56) References Cited

U.S. PATENT DOCUMENTS

| | | | |
|---|---|---|---|
| 2,149,836 | * | 3/1939 | Brown ........................... 181/59 |
| 2,340,152 | * | 1/1944 | Steensen ........................ 183/15 |
| 3,614,859 | * | 10/1971 | Clark ............................. 55/276 |
| 4,471,754 | * | 9/1984 | Galtz ........................... 126/110 B |
| 4,530,658 | * | 7/1985 | Panick .......................... 431/329 |
| 4,846,300 | * | 7/1989 | Boda ............................. 181/229 |
| 4,923,033 | * | 5/1990 | Panick et al. .................. 181/211 |

FOREIGN PATENT DOCUMENTS 1 480 406 * 4/1969 (DE) .
22 00 796 * 11/1977 (DE) .

* cited by examiner

*Primary Examiner*—Robert E. Nappi
*Assistant Examiner*—Edgardo San Martin
(74) *Attorney, Agent, or Firm*—Nixon Peabody LLP; David S. Safran

(57) ABSTRACT

An air intake muffler for a heater, especially a motor vehicle heater, with a hollow body (7) of sound-absorbing material which is surrounded by a muffler chamber (2) and is penetrated by a cavity (8) which is flush with an inlet connection (9) and an outlet (10) of the muffler chamber (2) which can be connected to an air intake opening of the heater. To reliably prevent water or moisture from penetrating into an assembly downstream of the muffler (1), it is provided that the muffler chamber (2) is downstream of a water separator which has a water separation chamber (3) with at least one air intake opening (20 to 23) in its wall located laterally offset relative to the inlet of the muffler chamber (2) and which is separated from the muffler chamber by a deflector wall (24 to 27) which prevents direct flow from the air intake opening to the inlet connection (9).

13 Claims, 2 Drawing Sheets

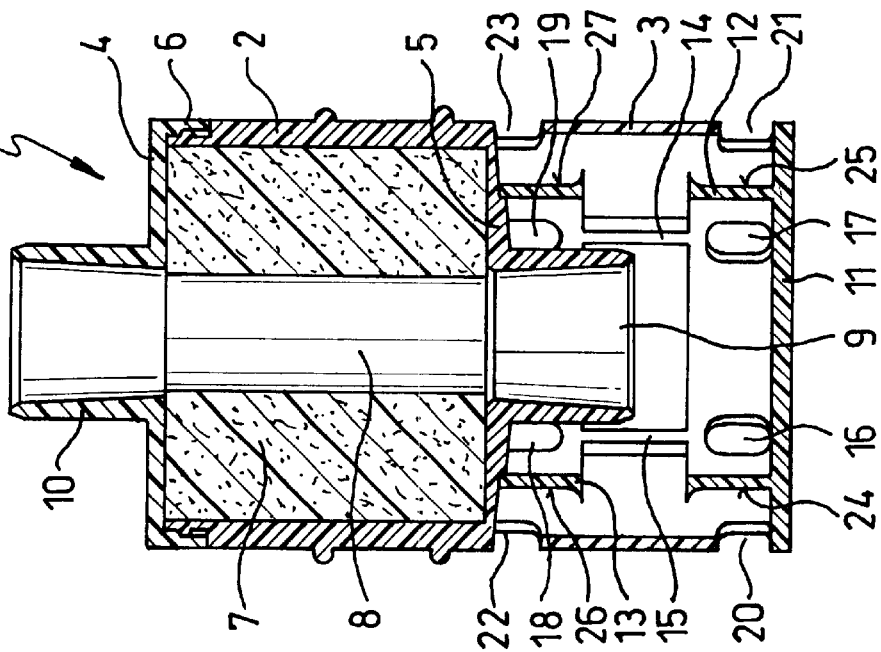
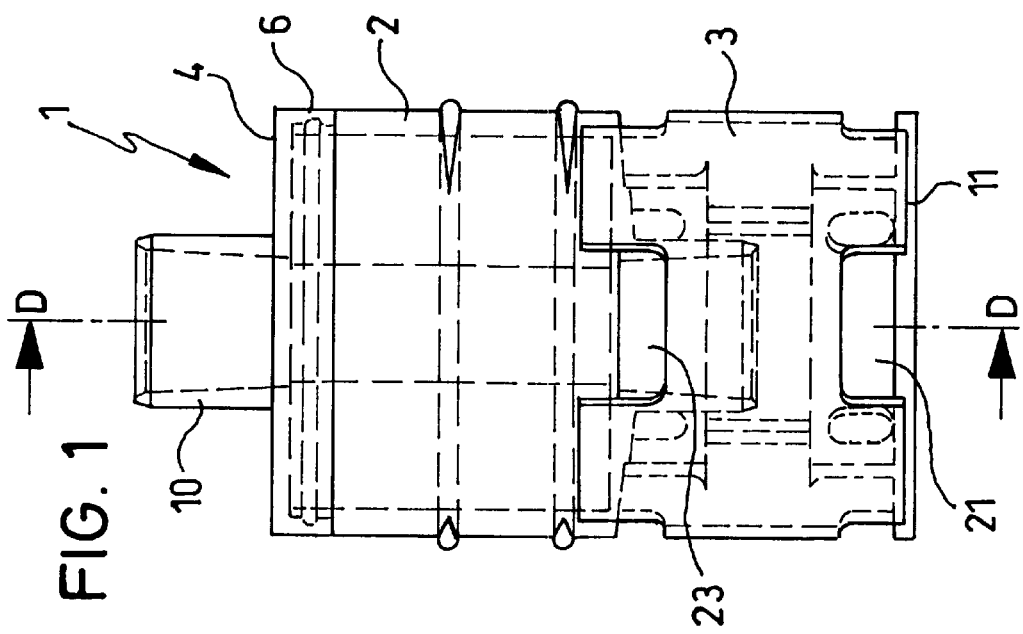

AIR INTAKE MEANS WITH WATER SEPARATOR

BACKGROUND OF THE INVENTION

1. Field of the Invention

The invention relates to an air intake means for a heater, especially a motor vehicle heater with a muffler.

2. Description of Related Art

An air intake means with a muffler is known, for example, from published German Patent Application DE-A1 1 480 406. This muffler, which is located in the air feed line of motor vehicles, however, has the disadvantage that moisture or water present in the air that is taken in is drawn in unhindered at the same time and can adversely affect operation of the intake assembly of the motor vehicle.

An air intake means with a muffler of similar design is known from published German Patent Application DE 22 00 796 B2 and has a sound-absorbing body which is made in the form of a labyrinth so that the moisture or water which has been entrained in the air is at least partially retained in it. But here, the disadvantage is that the sound-absorbing material absorbs the moisture, and thus, changes its properties. In addition, no measures are taken to drain an excess of moisture or water so that there is the danger that this sound absorber becomes overloaded with moisture which is finally sucked into the downstream assembly.

SUMMARY OF THE INVENTION

The primary object of this invention is to devise an air intake means which ensures reliable separation of moisture and water in the air that is taken in through it.

This object is achieved by an air intake means that has an intake connection and a water separator located upstream of the inlet connection, the water separator having a water separation chamber with at least one air intake opening which is laterally offset relative to the inlet connection and is separated from the inlet connection by at least one deflector wall. This results in the moisture or water in the air which is taken in being separated on the deflector wall and being able to escape through the air intake opening in the water separator chamber before it enters the heating device or an upstream muffler, so that it is reliably guaranteed that no moisture or water reaches the muffler and the downstream assembly.

Basically, the arrangement of the intake fitting and the water separator chamber of the air intake means in accordance with the invention can be made in any manner. However, one preferred geometry is a cylindrical shape in which, in the presence of a muffler chamber, the two chambers are made cylindrical and are axially joined to one another, the inlets and outlets of the muffler chamber and the inlet connection running at least essentially along the longitudinal center line of the cylindrical arrangement.

Advantageously, there are several air intake openings in at least one radial plane of the cylindrical water separator chamber, and the deflector wall assigned to each air intake opening forms an uninterrupted section of an annular wall which lies in this radial plane and which runs coaxially to the longitudinal center axis of the cylindrical chamber arrangement. Furthermore, the deflector wall has a smaller diameter than the water separator chamber, the uninterrupted deflector wall section of the annular wall having an axial and radial extension which corresponds roughly to the axial and radial extension of the air intake openings.

To reduce the flow resistance of the air taken in through the cylindrical water separator, it is advantageously provided that the annular walls provided with deflector wall sections, outside the latter, have opening sections which are offset in the peripheral direction with reference to the air intake openings of the water separator chamber in order to prevent direct passage of air through the air intake openings in the jacket of the water separator chamber.

To reduce the flow resistance during air intake in the cylindrical water separator, it can, moreover, be advantageously provided that there is at least one second arrangement of air intake openings and an annular wall with deflector wall sections, that is, an arrangement which lies in a common radial plane and which is axially offset to a first arrangement of air intake openings.

In the case of a double inter-nested arrangement of air intake openings/annular walls, the free end of the inlet connection of the muffler chamber is located advantageously between these two arrangements at the height of an uninterrupted annular section of the cylindrical jacket of the water separator chamber.

These and further objects, features and advantages of the present invention will become apparent from the following description when taken in connection with the accompanying drawings which, for purposes of illustration only, show several embodiments in accordance with the present invention.

BRIEF DESCRIPTION OF THE DRAWINGS

FIG. 1 shows a side view of one embodiment of the air intake means in accordance with the invention in conjunction with a downstream muffler, FIG. 2 shows a sectional view taken along line D—D in FIG. 1.

DETAILED DESCRIPTION OF THE INVENTION

Figure 3:
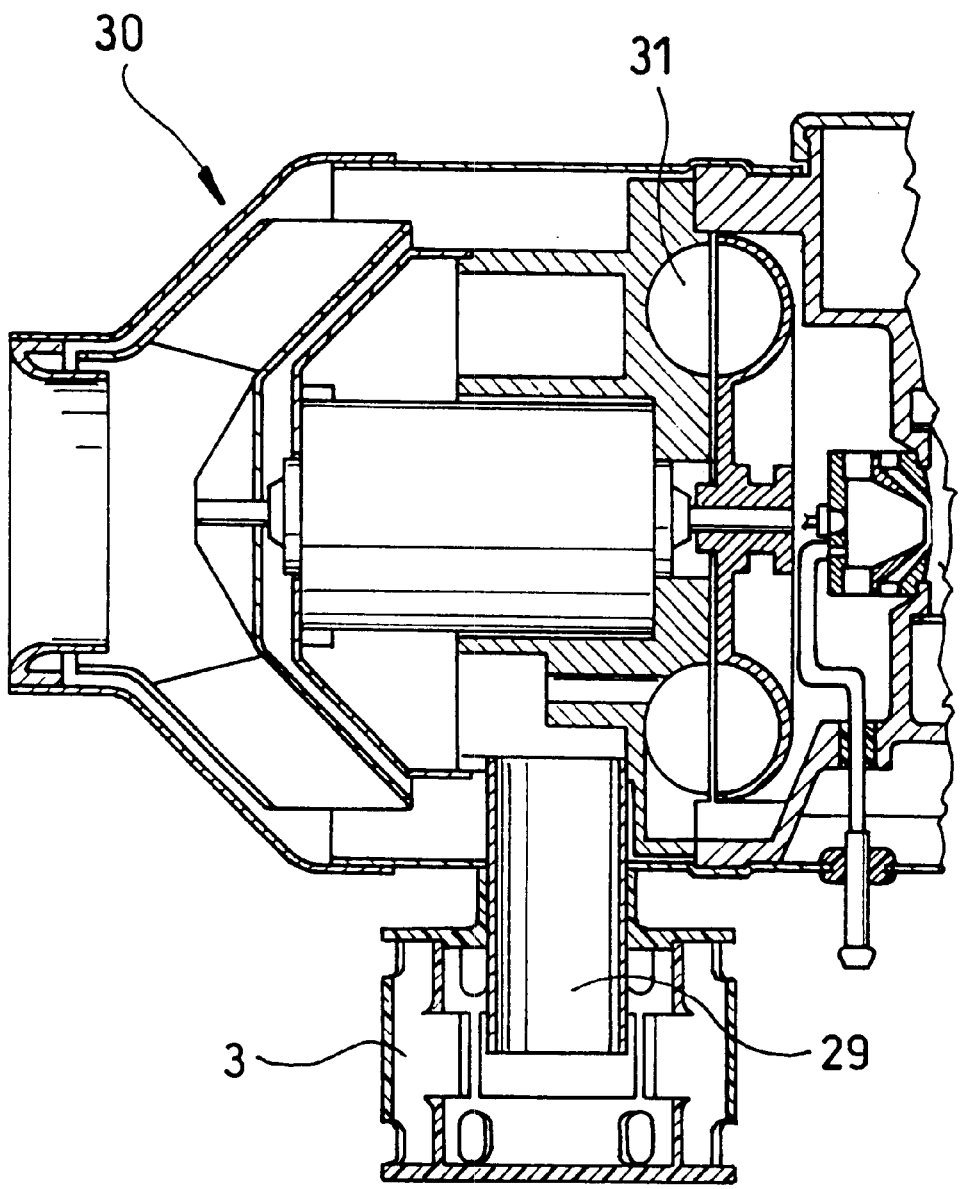
FIG. 3 shows a motor vehicle heater with a water separator without an interposed muffler.

The air intake means I which is shown in FIGS. 1 & 2 is made as air intake muffler for connection to a motor vehicle heater (see, FIG. 3), and overall, is formed of a cylindrical body which has two axially successive functional parts, specifically, one part which acts as a muffler and one part which acts as a water separator and which is connected upstream of the muffler in the flow direction of the air taken in. Both functional parts of the air intake muffler 1 are made, preferably, of plastic. The air intake muffler 1 comprises a cylindrical muffler chamber 2 and a cylindrical, pot-shaped, water separation chamber 3.

The cylindrical body of the muffler chamber 2 is sealed on both end faces by disk-shaped sealing parts, specifically by a cover 4 and by a bottom 5. In the embodiment shown, the bottom 5 is made integral with the cylindrical body of the muffler chamber 2, while the cover 4 is provided with an annular edge 6 which is directed toward the bottom 5, and which fits over the top edge of the cylindrical wall of the muffler chamber and is connected to it, for example, by an interference fit or a catch connection.

Thus, the cover 4 can be detached from the cylindrical body of the muffler chamber 2 in order to be able to insert a muffler element 7 into the muffler chamber 2, and optionally, to be able to replace it with a new muffler element 7. The muffler element 7 is made, for example, of a cylindrical foam body with a center hole 8 and with an outside periphery which is in form-fitted contact with the inside periphery of the muffler chamber 2.

Axially flush with the hole 8, the bottom 5 and the cover 4 arc provided with an inlet connection 9 and an outlet connection 10. The inlet connection 9 and the outlet connection 10 have the same shape, i.e., a cylindrical outside periphery and an inside peripheral wall which widens slightly conically towards the axially outer edge. The connection 9 is formed integrally, i.e., in one-piece, with the bottom 5 and the connection 10 is formed integrally with the cover 4.

The outlet connection 10 is used, for example, for connection to the air intake opening of a motor vehicle heater.

When air is taken in by the heater, in use, via the inlet connection 9, the hole 8 and the outlet connection 10, it passes through the muffler chamber 2, and the intake noise which is associated with this intake process is absorbed by the material of the muffler element 7 in a conventional manner.

The bottom of the muffler chamber 2 adjoins the water separator chamber 3 which forms a cylindrical, beaker-shaped part which is open, at the connection side, to the muffler chamber 2 and is closed at its axially opposite end by a bottom part 11. The water separation chamber 3 is composed of an upstream outer annular wall 13 and a downstream annular wall 12 which is connected to the bottom part 11. The open annular edge of the beaker-shaped water separator chamber 3, similarly to the cover 4, fits around the cylindrical muffler chamber 2 and is attached to it by an interference fit or by means of a catch connection or by screw threads or by being cemented to the muffler chamber 2. When, in a simpler embodiment, the water separation chamber 3 is seated directly on an intake fitting of a motor vehicle heater without a downstream muffler (FIG. 3, described below), the water separation chamber 3 a cover is provided on the end face opposite the bottom part 11 cover which has an opening for a tight connection to the intake fitting.

While the cylindrical jacket of the muffler chamber 2 is solid, i.e., formed without openings, the cylindrical, beaker-shaped water separation chamber 3 has several air intake openings 20, 21 and recesses 22, 23 in its cylindrical jacket.

As follows from FIG. 2, and also from FIG. 1 (shown there by a broken line), the inlet connection 9 of the muffler chamber 2 extends axially into the water separation chamber 3 to an extent roughly up to one half height of this chamber. This means that the outside edge of the inlet connection 9 is in a radial plane of the cylindrical, beaker-shaped water separation chamber 3 which axially divides this chamber roughly into two identical halves. On either side of this plane in a mirror-symmetrical arrangement there are two annular walls 12 and 13 which have the same diameter, which is less than the diameter of the outer jacket of the water separation chamber 3, so that an annulus remains between the annular walls 12 and 13 and this outer jacket. In this embodiment, the bottom annular wall 12 is permanently connected to the inside of the bottom part 11 of the water separation chamber 3, and is preferably formed integrally, i.e., as one-piece therewith. The upper annular wall 13 is connected to the bottom annular wall 12 to be axially aligned via four axial bridges which are spaced peripherally every 90°, of which only two bridges 14 and 15 are shown in FIG. 2 as a result of the cross-sectional representation. The annular edge of the top annular wall 13 pointing towards the muffler chamber 2 in the assembled state adjoins the outside of the bottom 5 of the muffler chamber 2.

Aligned with the four axial bridges 14 and 15, four openings are formed in the bottom annular wall 12, of which two openings 16 and 17 can be seen in FIG. 2 as a result of the cross-sectional representation. Similarly, at the top annular edge of the top annular wall 13, four recesses are formed, of which two recesses 18 and 19 can be seen in FIG. 2. For the muffler or water separation chambers 2 and 3 connected to one another, the recesses 18, 19 in the top annular wall 13 are sealed by the adjoining bottom 5 of the muffler chamber 2 on its upper edge, and thus, functionally, openings are formed similar to the openings 16 and 17 in the bottom annular wall 12. If there is no adjacent muffler chamber, but the water separator is located directly on an intake fitting of the motor vehicle heater, the top face of the water separation chamber 3 is closed with its own disk-shaped cover which then borders the recesses 18 and 19 (see, FIG. 3).

The aforementioned air intake openings 20, 21 and recesses 22, 23 in the cylindrical jacket of the water separation chamber 3 lie in the same radial plane as the bottom annular wall 12 or the top annular wall 13. In each of these radial planes in the cylindrical jacket of the water separation chamber 3 in the respective radial planes four air intake openings at a time are formed, of which in FIG. 1 and FIG. 2 two air intake openings 20, 21 bordering the bottom part 11 of the water separation chamber 3 and two recesses 22 and 23 with the bottom part 5 can be recognized. The air intake openings 20, 21 on the side of the bottom part are arranged peripherally offset by 90° each. The corresponding recesses 22, 23 on the upper annular edge of the water separation chamber 3 have the same geometric arrangement. The air intake openings 20, 21 and recesses 22, 23 in the jacket of the water separation chamber 3 are located along the same jacket lines. Relative to FIG. 2, accordingly, the air intake opening 20 lies on the same axial jacket line as the air intake recess 22 and the air intake opening 21 lies on the same axial jacket line as the air intake recess 23, these two jacket lines being offset relative to one another in the peripheral direction by 180°. The same applies to the two opening-recess pairs which are not visible in FIG. 2.

With reference to the openings 16, 17 and recesses 18, 19 in the annular walls 12, 13, the air intake openings 20, 21 and the air intake recesses 22, 23 in the jacket of the water separation chamber 3 are arranged offset by 45° relative to one another. Accordingly, in the radial direction, viewed from the outside to the inside, behind each air intake opening, for example, the air intake openings 20, 21, there is a solid, unperforated section of the bottom annular wall 12, while behind each air intake recess, for example, the air intake recesses 22, 23, an unperforated section of the top annular wall 13 comes to rest. These unperforated sections of the annular walls 12, 13 thus form deflector walls or flow guide walls 24 to 27 for the air which is taken in through the air intake openings 20, 21 or recesses 22, 23 in the jacket of the water separation chamber 3. To the extent this air entrains moisture, this results in this moisture being deposited on the deflector walls 24 to 27 from the incoming air flow and its being able to flow again to the outside through the openings or recesses.

Similarly, the openings or recesses in the annular walls 12, 13, for example, the openings 16, 17 and the recesses 18, 19, lie in the radial direction, viewed from the inside to the outside, in front of the unperforated sections of the cylindrical jacket of the water separator 3 so that air cannot be taken indirectly through these openings 16,17 or recesses 18, 19 in the annular walls 12, 13 from the air intake openings 20, 21 or recesses 22, 23 in the jacket of the water separation chamber 3. The openings 16, 17 or the recesses 18, 19 in the annular walls 12, 13 are not mandatory for the function of the water separator, but are used only to reduce the flow resistance of the air taken in through the air intake openings 21, 22 and recesses 22, 23 of the jacket of the water separation chamber 3.

As a result of the axially central arrangement of the inlet-side edge of the inlet connection 9 in the water separation chamber 3, air is intaken through the inlet connection 9 from an axial area of the water separation chamber 3 which in the radial direction is opposite a continuously closed annular section of the jacket of the cylindrical water separation chamber 3 so that air flows into the inlet connection 9 solely indirectly via the air intake openings 20, 21 or recesses 22, 23 in this jacket, i.e., axially offset relative to the free annular edge of the inlet connection 9 in the latter, bypassing the indicated deflector wall sections of the top and bottom annular wall 12, 13, i.e., after separation of the moisture which may be contained in the intaken air. This guarantees that no water is sucked into the heater which follows downstream in the direction of air flow after the air intake muffler 1.

The invention is especially suited for those motor vehicle heaters with an air intake fitting which must be located in an area of the motor vehicle which is endangered by splashing water as a result of the tight conditions in the engine compartment.

The labyrinthine path which the intake air must take through the water separation chamber 3 before it reaches the intake fitting 9 of the muffler chamber 2 ensures that, regardless of the installation location of the air intake means, the moisture is kept out before the air enters into the actual muffler or intake fitting of the motor vehicle heater. The captured water is returned to the environment via the openings 16, 17, 20, 21 or the recesses 18, 19, 22, 23 in the housing of the water separation chamber 3.

In another embodiment, which is shown in FIG. 3 without a muffler, the water separation means in accordance with the invention is, as shown, located directly on an inlet connection 29 of a motor vehicle heater 30, or with the interposition of an extension tube or hose. The inlet connection 29 is connected to a combustion air fan 31 which delivers combustion air into a combustion chamber which is not shown in detail. A separate bottom is used as the end termination of the water separation means, since the bottom 5 of the muffler is not available here. Otherwise all parts are identical to the water separation means shown in FIGS. 1 and 2.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

We claim:

1. Air intake means for a motor vehicle heater with an inlet connection and a water separator located upstream of the inlet connection, the water separator having a water separation chamber with at least one air intake opening which is laterally offset relative to the inlet connection and is separated from the inlet connection by at least one deflector wall; wherein a cylindrical muffler chamber forms a cylindrical extension of the water separation chamber and has an inlet connection and an outlet connection which are aligned with a longitudinal center axis thereof; and wherein the water separation chamber has an outer jacket in which there is at least a first set of air intake openings; and wherein the at least one deflector wall has at least a first annular wall with an uninterrupted section and a smaller diameter than the water separation chamber, the uninterrupted section of the annular wall having an axial and a radial extension which is at least equal to the axial and radial extension of the air intake openings in the outer jacket.

2. Air intake means as claimed in claim 1, wherein the annular wall has open sections which are offset in a circumferential direction relative to the air intake openings of the outer jacket.

3. Air intake means as claimed in claim 1, wherein there is at least a second set of air intake openings and at least a second annular wall with deflector wall sections arranged in a common radial plane which is axially offset relative to the first set of air intake openings and the the first deflector wall.

4. Air intake means as claimed in claim 3, wherein each of said first and second sets of air intake openings and first and second annular walls are located in a respective axial end area of the water separation chamber.

5. Air intake means as claimed in claim 3, wherein the inlet connection has a free end located between the two sets air intake openings and said first and second annular walls and at the height of an uninterrupted annular section of the outer jacket of the water separation chamber.

6. Air intake means as claimed in claim 1, wherein at least the water separation chamber is made of plastic.

7. Air intake means as claimed in claim 1, wherein the muffler chamber is detachably joined to the water separation chamber.

8. Air intake means for a motor vehicle heater with an inlet connection and a water separator located upstream of the inlet connection, the water separator having a water separation chamber with at least one air intake opening which is laterally offset relative to the inlet connection and is separated from the inlet connection by at least one deflector wall; wherein the water separation chamber has an outer jacket in which there are several air intake openings; wherein the at least one deflector wall comprise at least a first annular wall with an uninterrupted section and a smaller diameter than the water separation chamber and a second annular wall with an uninterrupted section and a smaller diameter than the water separation chamber, the uninterrupted sections of the annular walls having an axial and a radial extension which is at least equal to the axial and radial extension of the air intake openings in the outer jacket.

9. Air intake means as claimed in claim 8, wherein the annular walls have open sections which are offset in a circumferential direction relative to the air intake openings of the outer jacket.

10. Air intake means as claimed in claim 1, wherein there is at least a second set of air intake openings and at least a second annular wall with deflector wall sections arranged in a common radial plane which is axially offset relative to the first set of air intake openings and the first deflector wall.

11. Air intake means as claimed in claim 10, wherein each of said first and second sets of air intake openings and annular walls are located in a respective axial end area of the water separation chamber.

12. Air intake means as claimed in claim 10, wherein the inlet connection has a free end located between the two sets air intake openings and said annular walls and at the height of an uninterrupted annular section of the outer jacket of the water separation chamber.

13. Air intake means according to claim 1, wherein a labyrinthine air flow path to said inlet connection is formed by the air intake openings and the at least one deflector wall.

* * * * *